(12) United States Patent
Guo et al.

(10) Patent No.: US 11,257,286 B2
(45) Date of Patent: Feb. 22, 2022

(54) METHOD FOR RENDERING OF SIMULATING ILLUMINATION AND TERMINAL

(71) Applicant: Tencent Technology (Shenzhen) Company Limited, Shenzhen (CN)

(72) Inventors: Jinhui Guo, Shenzhen (CN); Bin Li, Shenzhen (CN); Hui Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 72 days.

(21) Appl. No.: 16/789,263

(22) Filed: Feb. 12, 2020

(65) Prior Publication Data

US 2020/0184714 A1 Jun. 11, 2020

Related U.S. Application Data

(63) Continuation of application No. PCT/CN2018/093322, filed on Jun. 28, 2018.

(30) Foreign Application Priority Data

Aug. 18, 2017 (CN) .......................... 201710711285.3

(51) Int. Cl.
*G06T 15/55* (2011.01)
*G06T 17/20* (2006.01)

(52) U.S. Cl.
CPC .............. *G06T 15/55* (2013.01); *G06T 17/20* (2013.01)

(58) Field of Classification Search
CPC ......... G06T 15/55; G06T 17/20; G06T 15/50; G06T 15/506; G06T 7/90; G06T 11/20
See application file for complete search history.

(56) References Cited

U.S. PATENT DOCUMENTS 9,639,773 B2 5/2017 Lalonde et al.
10,643,375 B2 * 5/2020 Rezaiifar .................. G06T 7/50
(Continued)

FOREIGN PATENT DOCUMENTS

CN 104157000 A * 11/2014
CN 104157000 A 11/2014
(Continued)

OTHER PUBLICATIONS

CN 104157000 A (Machine Translation on Jun. 15, 2021) (Year: 2014).*
(Continued)

*Primary Examiner* — Michael Le
(74) *Attorney, Agent, or Firm* — Morgan, Lewis & Bockius LLP

(57) ABSTRACT

Embodiments of this application disclose a method for rendering of simulating illumination performed at a terminal, including: obtaining first grid vertex information of a preset first virtual object model, the first grid vertex information including first color information and first normal information, the first normal information being obtained by baking a high model corresponding to the preset first virtual object model; performing vertex space conversion on the first normal information to obtain second normal information corresponding to the first grid vertex information; obtaining first illumination information corresponding to the first grid vertex information according to a preset color setting rule and the second normal information, the preset color setting rule being used to represent a correspondence between colors and illumination; and rendering the first virtual object model by using the first illumination information, the first color information, and the first grid vertex information to obtain a second virtual object model.

20 Claims, 6 Drawing Sheets

(56) References Cited

U.S. PATENT DOCUMENTS

| | | | | |
|---|---|---|---|---|
| 2002/0158881 A1* | 10/2002 | vanWelzen | ............ | G06T 11/40 |
| | | | | 345/582 |
| 2009/0174701 A1* | 7/2009 | Cotter | .................... | G06T 7/596 |
| | | | | 345/419 |
| 2014/0028678 A1* | 1/2014 | Chmielewski | ......... | G06T 5/002 |
| | | | | 345/426 |
| 2015/0146972 A1* | 5/2015 | Lalonde | ............... | G06K 9/4661 |
| | | | | 382/155 |
| 2017/0193690 A1* | 7/2017 | Ha | ....................... | G06T 15/506 |

FOREIGN PATENT DOCUMENTS

| | | | | |
|---|---|---|---|---|
| CN | 104966312 A | 10/2015 | | |
| WO | WO-2015188749 A1 * | 12/2015 | ........... | G06T 15/005 |

OTHER PUBLICATIONS

Tencent Technology, ISRWO, PCT/CN2018/093322, Sep. 27, 2018, 5pgs.

Tencent Technology, IPRP, PCT/CN2018/093322, Feb. 18, 2020, 4pgs.

"Character Production Process—Same as the Previous Post, but the Process Including Color Map Production", Aug. 14, 2015, 20 pgs., Retrieved from the Internet: https://blog.naver.com/sspsos74/220450396662.

Sorkelf, "3D Programming", Apr. 19, 2012, 10 pgs., Retrieved from the Internet: https://blog.naver.com/sorkelf/40157218010.

* cited by examiner

METHOD FOR RENDERING OF SIMULATING ILLUMINATION AND TERMINAL

CROSS-REFERENCE TO RELATED APPLICATIONS

This application is a continuation application of PCT/CN2018/093322, entitled "METHOD FOR RENDERING OF SIMULATING ILLUMINATION AND TERMINAL" filed on Jun. 28, 2018, which claims priority to Chinese Patent Application No. 201710711285.3, entitled "METHOD FOR RENDERING OF SIMULATING ILLUMINATION AND TERMINAL" filed with the Chinese Patent Office on Aug. 18, 2017, both of which are incorporated by reference in their entirety.

FIELD OF THE TECHNOLOGY

This application relates to modeling technology in the field of electronic application, and in particular, to rendering of simulating illumination.

BACKGROUND OF THE DISCLOSURE

With continuous development of science and technology, electronic technology also develops rapidly. There are more types of electronic products, and people also enjoy various convenience brought by the development of science and technology. Nowadays, people may enjoy a comfortable life brought by the development of science and technology by using various types of electronic devices or terminals, and applications with various functions installed on the terminals (application terminals).

Currently, a user character or an image is simulated by using a virtual object (such as a three-dimensional virtual character) in a social application or a game application, and the simulated image is vivid. A terminal (a development terminal) usually generates a three-dimensional virtual object by using a Unity development tool. First, the terminal (the development terminal) may obtain a design model from a model design tool, and import the design model into the Unity development tool to process a three-dimensional scene and a three-dimensional virtual object. A usually used model design tool is Cinema 4D. However, the Cinema 4D has a poor compatibility with the Unity, that is, the model design tool provides a design model with a relatively good ambient light effect, but the Unity development tool does not provide such good ambient light, and therefore a poor effect is produced by importing the design model into the Unity.

In this case, a usual solution is to simulate the ambient light effect of the design tool by using a combination of multiple lights in the Unity, but the ambient light simulated by using the combination of multiple lights causes a significant reduction of performance and flexibility of the design model, and when a three-dimensional virtual character moves, an illumination effect cannot be controlled due to that a light combination model is unchangeable, resulting in a poor display effect of the three-dimensional virtual object or character.

SUMMARY

In order to resolve the foregoing technical problems, embodiments of this application provide a method for rendering of simulating illumination and a terminal, capable of simulating ambient light close to that of real environment on the basis of guaranteeing shadow details of a three-dimensional design model, and processing a three-dimensional virtual object model by using the simulated ambient light, so that a display effect of the three-dimensional virtual object model or a virtual figure model is improved.

The technical solutions in this application are implemented as follows:

An embodiment of this application provides a method for rendering of simulating illumination performed at a terminal having one or more processors and memory storing a plurality of programs to be executed by the one or more processors, including:

obtaining, by the terminal, first grid vertex information of a preset first virtual object model, the first grid vertex information including first color information and first normal information, and the first normal information being obtained by baking a high-precision model corresponding to the preset first virtual object model;

performing, by the terminal, vertex space conversion on the first normal information to obtain second normal information corresponding to the first grid vertex information;

obtaining, by the terminal, first illumination information corresponding to the first grid vertex information according to a preset color setting rule and the second normal information, the preset color setting rule being used to represent a correspondence between colors and illumination; and rendering, by the terminal, the first virtual object model by using the first illumination information, the first color information, and the first grid vertex information to obtain a second virtual object model.

An embodiment of this application provides a terminal comprising one or more processors, memory coupled to the one or more processors and a plurality of programs stored in the memory that, when executed by the one or more processors, cause the computing device to perform the aforementioned method for rendering of simulating illumination.

An embodiment of this application provides a non-transitory computer readable storage medium, applied to a terminal, the computer readable storage medium storing one or more programs for rendering of simulating illumination, the one or more programs for rendering of simulating illumination being executable by one or more processors to implement the foregoing method for rendering of simulating illumination.

Embodiments of this application provide a method for rendering of simulating illumination and a terminal, including obtaining first grid vertex information of a preset first virtual object model, first color information corresponding to the first grid vertex information, and first normal information, the preset first virtual object model being a preset model to be processed, and the first normal information being obtained by baking a high-precision model corresponding to the preset first virtual object model; performing vertex space conversion on the first normal information to obtain second normal information corresponding to the first grid vertex information; obtaining first illumination information corresponding to the first grid vertex information according to a preset color setting rule and the second normal information, the preset color setting rule being used to represent a correspondence between colors and illumination; and rendering the first virtual object model by using the first illumination information, the first color information, and the first grid vertex information to obtain a second virtual object model. By using the foregoing technical solutions, the terminal may parse illumination information corresponding to each grid vertex according to refined normal information determined by the high-precision model and may thus use the illumination information as ambient light to render the first virtual object model. Because the normal information has a very high precision, shadow details of a three-dimensional design model are guaranteed, and the ambient light close to that of a real environment is simulated, a display effect of the rendered second virtual object model has a very high precision, so that the display effect of the second virtual object model is improved.

DESCRIPTION OF EMBODIMENTS

The following clearly and completely describes the technical solutions in the embodiments of this application with reference to the accompanying drawings in the embodiments of this application.

A method for rendering of simulating illumination provided in the embodiments of this application may be applied to any applications or functions using a three-dimensional model, and an application terminal may be installed with the foregoing application and implement a corresponding function by performing data interaction with a server corresponding to the application.

In the embodiments of this application, a method for rendering used by a terminal (a development terminal) when the terminal processes a three-dimensional model, to achieve a process of well displaying the three-dimensional model is mainly described.

Embodiment 1

Figure 1:
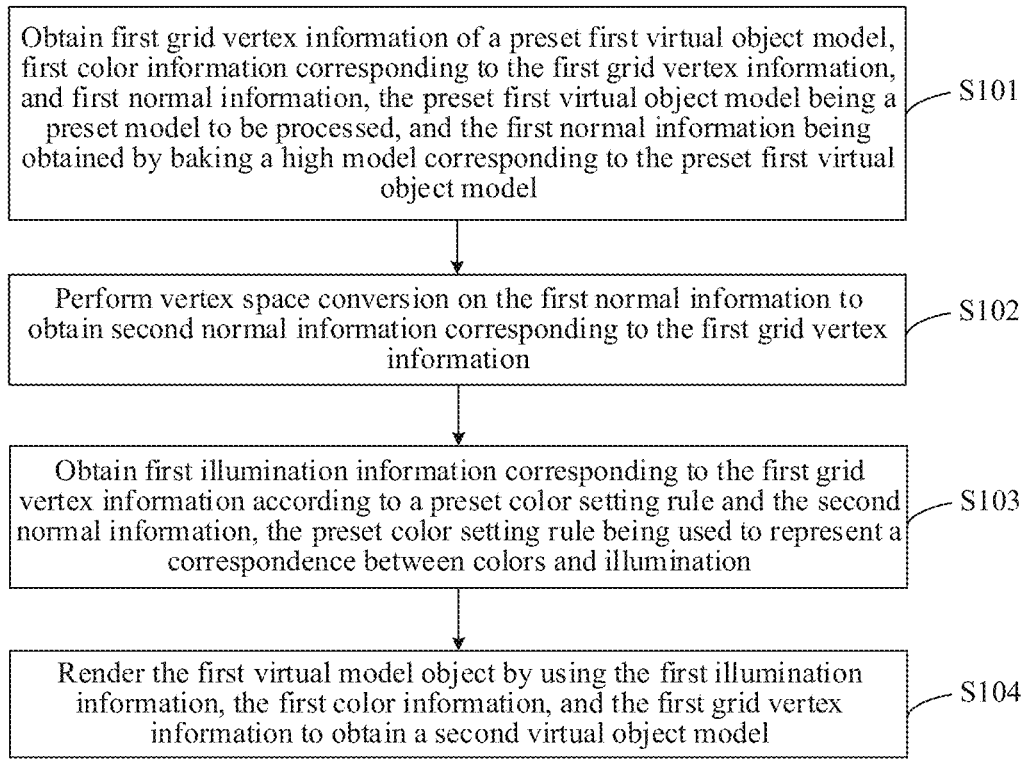
FIG. 1 is flowchart 1 of a method for rendering of simulating illumination according to an embodiment of this application.

An embodiment of this application provides a method for rendering of simulating illumination. As shown in FIG. 1, the method may include the following steps:

S101: Obtain first grid vertex information of a preset first virtual object model, first color information corresponding to the first grid vertex information, and first normal information, the preset first virtual object model being a preset model to be processed, and the first normal information being obtained by baking by a high-precision model corresponding to the preset first virtual object model.

In the embodiment of this application, when processing a three-dimensional model, a terminal may first establish a model by using a three-dimensional model design tool and then further process the model by using a three-dimensional model development tool, to finally obtain the three-dimensional model.

In the embodiment of this application, the three-dimensional model design tool may be 3ds Max, ZByush, Cinema 4D, or the like. The embodiment of this application is not limited a type of the model design tool. In addition, the three-dimensional model development tool may be Unity 3D, Unreal, or the like. The embodiment of this application is not limited to a type of the model development tool. In a possible implementation of the embodiment of this application, the three-dimensional model design tool is Cinema 4D, and the three-dimensional model development tool is Unity 3D.

The terminal establishes a needed three-dimensional virtual object model in the three-dimensional design tool and after the three-dimensional virtual object model is established, exports the three-dimensional virtual object model, for further model processing by the three-dimensional model development tool.

The embodiment of this application mainly describes the process of rendering the three-dimensional virtual object model in the three-dimensional model development tool after the three-dimensional virtual object model is established.

In the embodiment of this application, the terminal establishes a virtual object according to a requirement of application development. The terminal may establish a low model with low precision, that is, a preset first virtual object model, and a high-precision model with high precision, that is, a preset third virtual object model for the same virtual object. In other words, the preset first virtual object model and the preset third virtual object model are both models established for the same virtual object with a difference in the precision of modeling.

In this way, the terminal may obtain relevant information of the preset first virtual object model and the preset third virtual object model. Therefore, the terminal may generate a normal map according to the preset third virtual object model. A method for making a normal map may be high-precision model baking. Simply, by first making a high-precision model with millions of faces or tens of millions of faces or even hundreds of millions of faces (that is, the preset third virtual object model), then making a low-precision model with thousands of faces or tens of thousands of faces (that is, the preset first virtual object model), and then baking detail information of the high-precision model on the low model, a normal map is obtained. The three-dimensional model in the terminal approximately simulates an object by using a combination of a plurality of polygon faces and it is not smooth. A larger quantity of faces indicates a closer relationship of the three-dimensional model to a real object. In this way, when one point of a face is exposed to light, a normal is obtained by using interpolation through several vertices of the face. Actually, the interpolation is also to simulate a "correct" normal direction of the point. Otherwise, if normals of all points of the entire face are consistent, the model obtained when exposed to light, in an exaggerated way, is like mirrors spliced to each other.

On the basis of the foregoing implementation, the three-dimensional development tool of the terminal may parse the preset first virtual object model, obtain the first grid vertex information of the preset first virtual object model, and the first color information corresponding to the first grid vertex information, and also parse the normal map to obtain the first normal information. The first virtual object model is the preset model to be processed, and the first normal information is obtained by baking the high-precision model (that is, the preset third virtual object model) corresponding to the preset first virtual object model.

In this case, a UV map and a diffuse map of the preset first virtual object model can be obtained from the preset first virtual object model obtained by the terminal. Therefore, the terminal parses the UV map to obtain the first grid vertex information of the preset first virtual object model, and the terminal parses the diffuse map to obtain vertex color information of the preset first virtual object model, that is, the first color information.

In the embodiment of this application, the three-dimensional model is established by using different tangent planes. Therefore, there are multiple vertices in the preset first virtual object model, and the first grid vertex information is coordinate information of each grid vertex of the preset first virtual object model.

S102: Perform vertex space conversion on the first normal information to obtain second normal information corresponding to the first grid vertex information.

The first normal information obtained by the terminal is normal information related to an object space, and the terminal needs to guarantee that an illumination direction and normal information are in the same coordinate system during rendering. Further, the illumination direction is usually in a world space while the normal information is in an object space. Therefore, after the terminal obtains the first grid vertex information of the preset first virtual object model, the first color information corresponding to the first grid vertex information, and the first normal information, the terminal needs to perform the vertex space conversion on the first normal information by the terminal to meet a requirement of rendering and finally obtain the second normal information corresponding to the first grid vertex information.

In the embodiment of this application, each grid vertex may correspond to normal information (collectively referred to as the first normal information), and vertex information of each grid vertex is collectively referred to as the first grid vertex information. Therefore, the first grid vertex information of the preset first virtual object model corresponds to the first normal information.

In the embodiment of this application, the second normal information in the world space is obtained after the terminal performs the vertex space conversion on the first normal information.

The normal is a line perpendicular to a plane. An angle between light and the plane can be known by calculating an angle between the light and the normal, and color information to be obtained by the plane can be further obtained through calculation. The embodiment of this application processes the simulating illumination by using the principle. The first normal information corresponding to each grid vertex is stored at a corresponding pixel point on the normal map, and thus in the normal map, by storing the normal of each pixel point on a texture, a darkness degree of each pixel point can be determined according to the normal of the pixel point during rendering. That is, the first normal information records value details of highlights and shadows of each vertex information, and the first normal information is stored on the normal map as three colors, RGB (red, green, and blue).

In this case, one normal is a three-dimensional vector composed of three components X, Y and Z. Therefore, the three components are stored as values of the three colors, red, green, and blue, to generate a new map, that is, the normal map. In the normal map, a red channel and a green channel represent an offset of up, down, left, and right, and a blue channel represents a vertical offset.

It is to be understood that the terminal regards a pixel point on the normal map as a normal, and a size of the normal map is 512*512 pixels, that is, 262,144 pixels. In this case, if the normal map is adhered to the preset first virtual object model, it is equivalent to that there are 262,144 normals on the preset first virtual object model (certainly, it is not this case in reality), such that the preset first virtual object model with hundreds of faces immediately presents a detail effect of being with hundreds of thousands of faces.

S103: Obtain first illumination information corresponding to the first grid vertex information according to a preset color setting rule and the second normal information, the preset color setting rule being used to represent a correspondence between colors and illumination.

The terminal performs the vertex space conversion on the first normal information. After the second normal information corresponding to the first grid vertex information is obtained, the terminal can obtain the first illumination information corresponding to the first grid vertex information according to the preset color setting rule and the second normal information since the second normal information is in one-to-one correspondence to the first grid vertex information. That is, the terminal performs projection on a positive plane based on a normal corresponding to the second normal information, and therefore a projection point of the normal can be converted into UV coordinates (corresponding to the first grid vertex information) of the normal map. In this case, the terminal may set a color for each grid vertex corresponding to the UV coordinates according to the preset color setting rule to obtain the first illumination information, where the preset color setting rule is used to represent the correspondence between colors and illumination.

In this case, the terminal may store, according to the second normal information and the preset color setting rule, color information on each grid vertex of the first grid vertex information to obtain the second color information of the first grid vertex information and use the second color information as the first illumination information.

In the embodiment of this application, when normals in all directions are projected on a positive plane, a projection range is within x (−1,1) and y (−1,1), forming a circle. Therefore, a valid range of the normal map is substantially a circle. In this way, when making an illumination map by obtaining the first illumination information based on the second normal information, an area for storing the first illumination information in the illumination map is a circle.

In the embodiment of this application, the illumination map may be a material capture (MatCap) map, and displaying of an object of a reflective material and having a uniformly colored surface is implemented by using a Matcap map of a ball of specific material as a view-space environment map of the current material. Based on a shader of a MatCap idea, the terminal may not need to provide any illumination, but only to provide one or more suitable MatCap maps as "guidance" of an illumination result.

The shader in the embodiment of this application is a tool for rendering a three-dimensional model.

In the embodiment of this application, the preset color setting rule is based on a principle: black absorbs less light, while white absorbs more light. Therefore, when a grid vertex is exposed to strong light, the second color information set for the grid vertex is adjusted to be light and when a grid vertex is exposed to weak light, the disposed second color information set for the grid vertex is adjusted to be dark. In this way, the terminal can obtain the first illumination information using the second color information to represent illumination.

The color information may be selected from 0 to 255. A value closer to 0 indicates a darker color and a value closer to 255 indicates a lighter color. That is, if light at a circular center area of the illumination map is strong, the second color information is relatively light, and if light at an edge is weak, the second color information is relatively dark.

S104: Render the first virtual object model by using the first illumination information, the first color information, and the first grid vertex information to obtain a second virtual object model.

After the terminal obtains the first illumination information corresponding to the first grid vertex information according to the preset color setting rule and the second normal information, because the terminal is capable of using the first illumination information to simulate ambient light and the first illumination information is obtained by using the related normal information and integrated with high-precision illumination and shadow details, the ambient light is close to real ambient light. In this way, the terminal may render the first virtual object model according to the first illumination information, the first color information, and the first grid vertex information to obtain the second virtual object model.

In the embodiment of this application, the terminal may fill a vertex color of each grid vertex corresponding to the first grid vertex information by using the first illumination information and the first color information, to obtain main vertex color information of vertices, so as to use the main vertex color information to process the preset first virtual object model.

Further, in the embodiment of this application, rendering of the preset first virtual object model by the terminal may be processing on all aspects including a texture and a color. This is not limited in the embodiment of this application.

In the embodiment of this application, the normal map is established based on UVs of a model and may record detail values of highlights and shadows, and in this case, after the terminal obtains the normal map and applies the normal map onto the preset first virtual object model, the precision of the obtained second virtual object model is relatively high and concave-convex performance of a surface texture can be well reflected.

Figure 2:
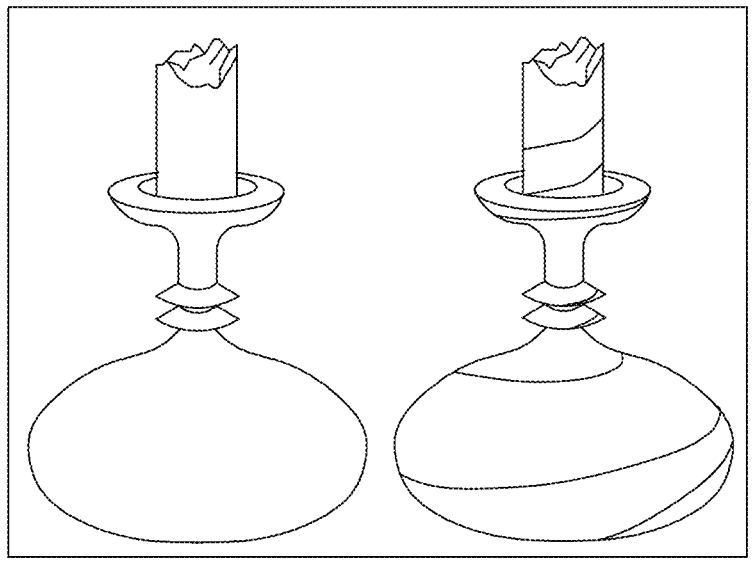
FIG. 2 is a schematic diagram of an effect of an exemplary normal map according to an embodiment of this application.

For example, the preset first virtual object model is assumed to be a candleholder model. As shown in FIG. 2, the left side shows a candleholder model, and after the normal map is applied onto the candleholder model, the candleholder model changes into a shape as shown in the right side and appears to be strongly stereotypic.

That is, the terminal may use the normal map to process texture details when rendering the three-dimensional model and generally the terminal implements the processing by using a vertex shader.

Figure 3:
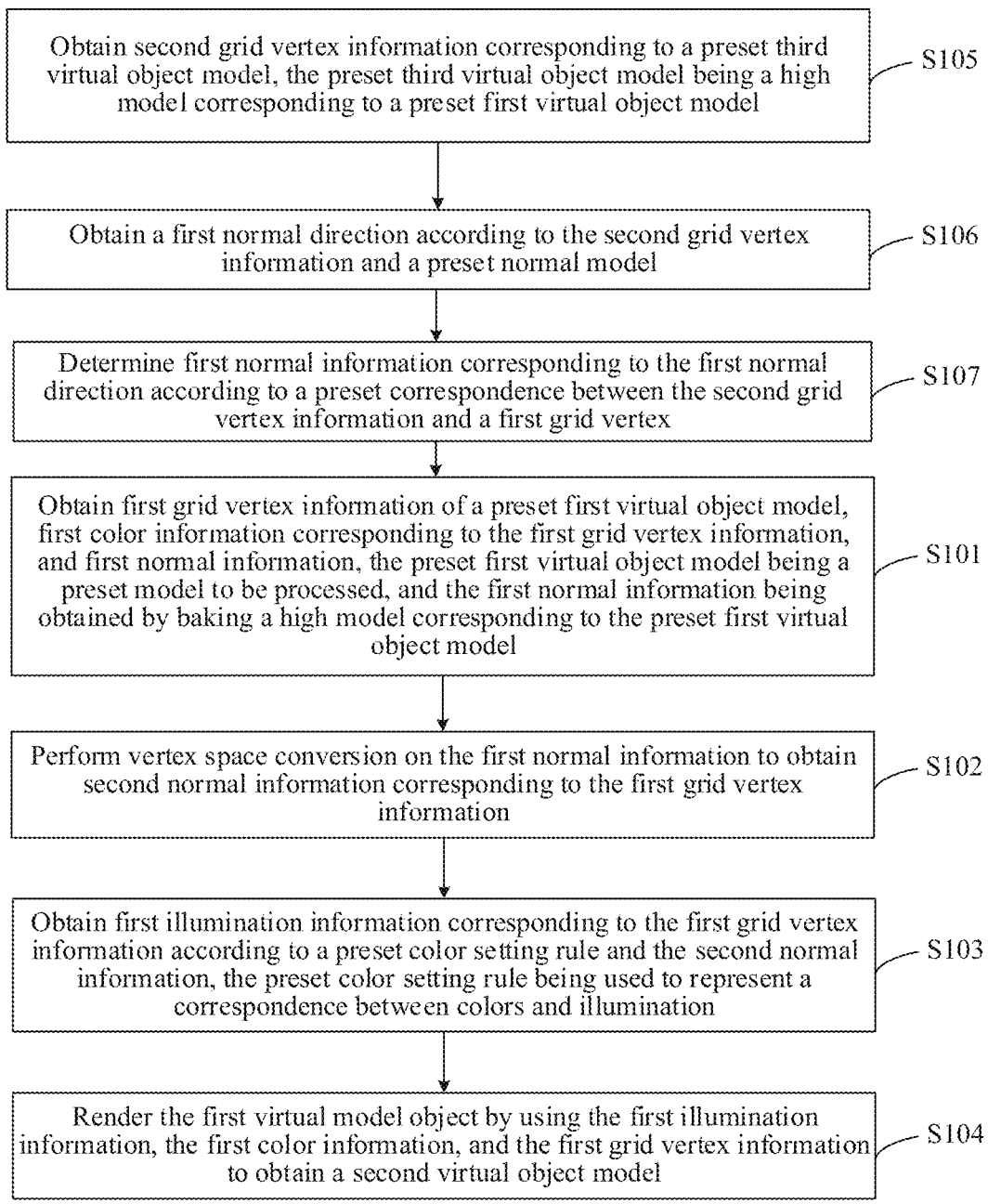
FIG. 3 is flowchart 2 of a method for rendering of simulating illumination according to an embodiment of this application.

Further, before S101, as shown in FIG. 3, a method for rendering of simulating illumination provided by the embodiment of this application may further include: S105 to S107 as follows:

S105: Obtain second grid vertex information corresponding to a preset third virtual object model, where the preset third virtual object model is a high-precision model corresponding to a preset first virtual object model.

S106: Obtain a first normal direction according to the second grid vertex information and a preset normal model.

S107: Determine first normal information corresponding to the first normal direction according to a preset correspondence between the second grid vertex information and a first grid vertex.

In the embodiment of this application, before implementing the rendering in the shader, the terminal first generates the normal map of the high-precision model that is the same as the simulated virtual object, so as to parse the first normal information from the normal map. A process for obtaining the normal map by the terminal may be a method for baking a high-precision model. That is, the terminal obtains the second grid vertex information corresponding to the high-precision model (that is, the preset third virtual object model) corresponding to the preset first virtual object model, obtains the first normal direction according to the second grid vertex information and the preset normal model, and finally determines the first normal information corresponding to the first normal direction according to the preset correspondence between the second grid vertex information and the first grid vertex.

The introduction of the normal map is to provide data of illumination and shadow details for a model with a small quantity of faces to simulate a model with a large quantity of faces. In this case, a significant factor is an included angle between a light incident direction and a normal of an incident point. The normal map essentially records related information of the included angle, and calculation of illumination is relevant to a normal direction on a face.

In this case, the terminal may obtain the second grid vertex information corresponding to the preset third virtual object model (that is, information of each grid vertex in the preset third virtual object model). When light irradiates on a point on a face of the preset third virtual object, a first normal direction of the point is obtained by performing interpolation on several grid vertices of the face (that is the preset normal model); then, the terminal projects the preset third virtual object model on the preset first virtual object model according to the preset correspondence between the second grid vertex information and the first grid vertex, to form a two-dimensional projection (for example, an x-y plane projection); therefore, the terminal obtains two projection directions of a first normal of each grid vertex corresponding to the first grid vertex information on the two-dimensional projection; and finally, the terminal uses the obtained first normal direction of each grid vertex as a z direction, so that the first normal information of each grid vertex is obtained. Then, the terminal stores the first normal information of each vertex to a corresponding pixel point on the normal map. In actual calculation, directions and sizes of x, y, and z in the first normal information are projected onto a color space rgb. That is, a value of x is stored in r, a value of y is stored in g, and a value of z is stored in b. When the terminal renders the preset first virtual object model, the normal map is obtained, and the terminal obtains the first normal information by parsing the normal map.

In a possible implementation, the normal map in the embodiment of this application may be an object space normal map.

The normal map, when being made, may also be made into a normal map in another space. This is not limited in the embodiment of this application.

Figure 4:
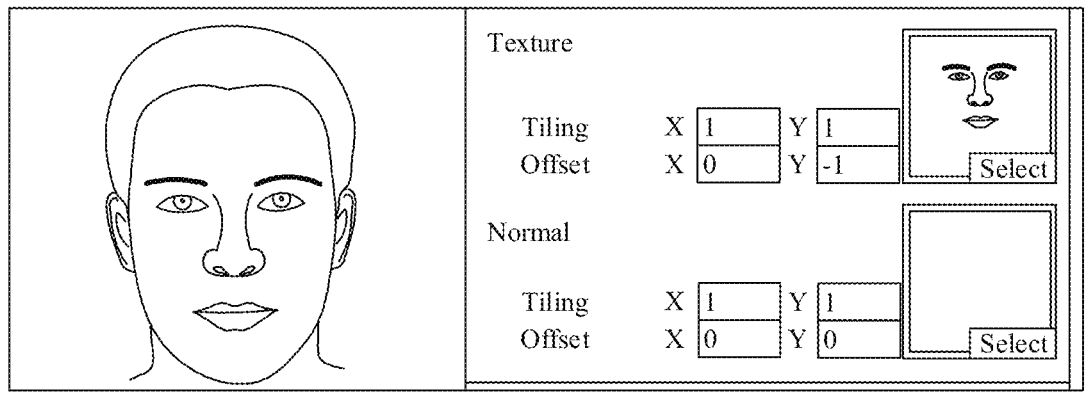
FIG. 4 is a diagram of an exemplary normal map making interface according to an embodiment of this application.
Figure 5:
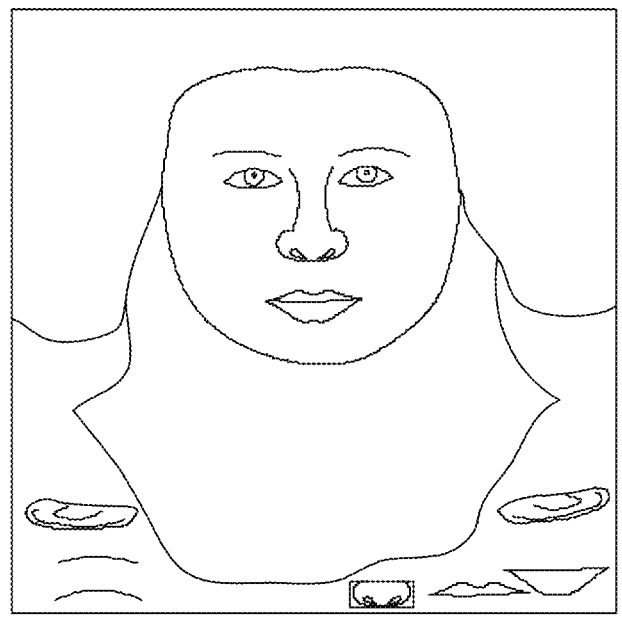
FIG. 5 is a schematic flat pattern of an exemplary model according to an embodiment of this application.
Figure 6:
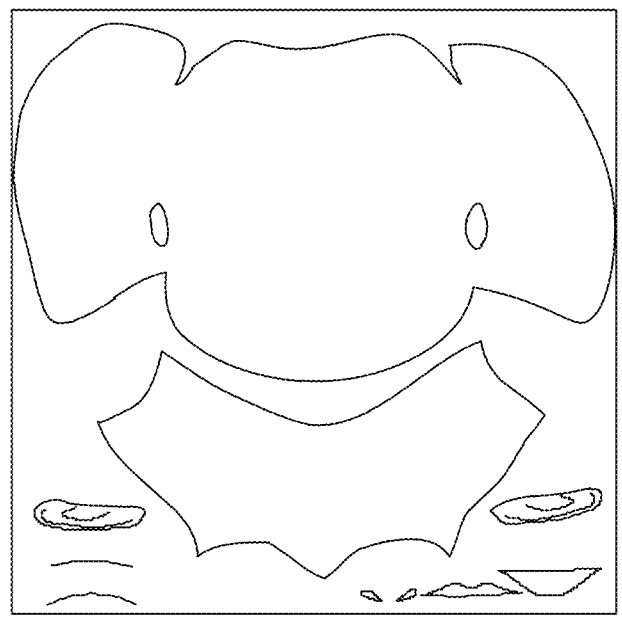
FIG. 6 is a schematic diagram of an exemplary normal map according to an embodiment of this application.

For example, in optimization of shadow control of a model using a normal map by the terminal, if it is assumed that the preset third virtual object model is a facial model, FIG. 4 shows a display window for making a normal map of the facial model. The facial model is projected to obtain a planar expansion image shown in FIG. 5 by using a baking method. Finally, the planar expansion image shown in FIG. 5 is stored in RGB values by the terminal to obtain a normal map shown in FIG. 6.

Further, before S105, a method for rendering of simulating illumination provided by the embodiment of this application further includes: S108 as follows:

S108: Obtain a scene file, and establish a first scene according to the scene file.

Before the terminal renders the preset first virtual object model, the terminal needs to obtain the scene file of the three-dimensional model to be established, to establish the first scene according to the scene file, and then to present and process the preset first virtual object model in the first scene.

The embodiment of this application is not limited to a type of the first scene, and the scene may be all types of scenes including snow-covered landscape and desert.

In the embodiment of this application, S108 is of the first executive order of the terminal to start model processing. That is, S108 may be executed by the terminal before S105 to S107.

Further, after S104, on the basis of implementing S108, a method for rendering of simulating illumination provided by the embodiment of this application may further include: S109 as follows:

S109: Display the second virtual object model in the first scene.

After the terminal obtains the rendered second virtual object model, because the second virtual object model is a model that has been rendered and drawn and the entire model is processed in the first scene, in this way, the terminal may display or present the second virtual object model in the first scene.

Embodiment 2

In a method for rendering of simulating illumination provided by the embodiment of this application, the method for performing vertex space conversion on the first normal information to obtain second normal information corresponding to the first grid vertex information in S102 may include: S1021 and S1022 as follows:

S1021: Perform the vertex space conversion on the first normal information to convert the first normal information into a tangent space, to obtain third normal information.

S1022: Normalize the third normal information to obtain second normal information.

In the embodiment of this application, the terminal needs to use the MatCap map, to mainly convert the first normal information from an object space into a tangent space and to transfer the first normal information to an area [0,1] suitable for extracting a texture UV.

In a process for generating a normal map, the tangent space used by the high-precision model (the preset third virtual object model) is on the low model (the preset first virtual object model). The terminal, when generating the normal map, may certainly determine which faces on the high-precision model correspond to which face on the low model, and then normals of the faces on the high-precision model are converted into coordinates of the constructed tangent space on the face of the low model. In this way, when the low model deforms, that is, when a triangle face changes, the tangent space of the low model also changes. External coordinates can be obtained by multiplying normal information (that is, a normal value) stored in the normal map by a conversion matrix from the tangent space of the face of the low model to an external coordinate system, where the first normal information stored in the high-precision model corresponds to a normal in the object space on the high-precision model.

In this case, a specific implementation for the terminal to perform the vertex space conversion on the first normal information to convert the first normal information into the tangent space is as follows: For each grid vertex corresponding to the first grid vertex information, a model-view matrix may be used to convert from the object space into the tangent space. However, if the model-view matrix is used to convert a normal vector of the first normal information from the object space into an eye space, in the eye space, a direction of tangent conforms to a definition, but the normal is not perpendicular to a tangent of the grid vertex. Therefore, the model-view matrix is not suitable for the normal. Because in a case in which T is assumed to be the tangent, MV is the model-view matrix, and P1 and P2 are two grid vertices associated by the tangent, $$T=P2-P1 \qquad (1)$$

$$T'=T*MV=(P2-P1)*MV=P2*MV-P1*MV=P2'-P1' \qquad (2).$$

Therefore, it can be learned from the formulas (1) and (2) that the definition to the tangent is retained in T' and for the normal, N=Q2−Q1 may further be found to represent the normal. However, after the conversion, Q2'−Q1' cannot be ensured to be perpendicular to T'. Therefore, an angle relationship between the object space and the view space is changed. For calculation of the conversion of the normal to maintain that the normal is perpendicular to the tangent, it is assumed that the normal matrix is G, since the normal is perpendicular to the tangent, a formula (3) can be derived:

$$N'\cdot T'=(GN)\cdot (MT)=0 \qquad (3)$$

After converting a dot product of the formula (3) to a cross product, a formula (4) is obtained:

$$(GN)\cdot (MT)=(GN)T*(MT)=(GN)T(MT)=(NTGT)(MT)$$
$$=NTGTMT=0 \qquad (4),$$

where NTT is 0.

If GTM=I, the formula (4) is established, and therefore G=(M−1)T.

That is, the normal matrix is a transposed matrix of an inverse matrix of the model-view matrix.

In this case, the first normal information can be converted into the tangent space from the object space using the normal matrix, so that the third normal information is obtained.

For example, descriptions are provided by using an example of the Unity. A built-in conversion matrix, a normal matrix, of the Unity may be indicated by:

UNITY_MATRIX_IT_MV, which is an inverse transposed matrix of

UNITY_MATRIX_MV (the model-view matrix), and a function of which is to convert the first normal information from the object space to the tangent space, to obtain the third normal information. The process is implemented in a vertex shader, as follows:

//prepare MatCap coordinates: convert the normal from the object space to the tangent space and stored in the latter two texture coordinates zw of TEXCOORD1 output.diffuseUVAndMatCapCoords.z=dot(normalize (UNITY_MATRIX_IT_MV[0].xyz), normalize(input.normal));

output.diffuseUVAndMatCapCoords.w=dot(normalize (UNITY_MATRIX_IT_MV[1].xyz), normalize(input.normal)).

In the embodiment of this application, after converting the first normal information from the object space into the tangent space to obtain the third normal information, the terminal further needs to convert the third normal information to a range [0, 1] suitable for extracting the texture UV to obtain the second normal information.

For example, descriptions are provided by using an example of the Unity. A process for normalizing the third normal information by the terminal to obtain the second normal information is implemented in the vertex shader, as follows:

//normalize.normal value range [−1, 1] to convert the range into a range [0, 1] suitable for the texture output.diffuseUVAndMatCapCoords.zw=output.diffuseUVAndMatCapCoords.zw*0.5+0.5.

The range corresponding to the obtained third normal information in the tangent space after the space conversion by the terminal is [−1, 1], and if the range needs to be converted into the range [0, 1] for extracting the texture UV, the range is multiplied by 0.5 and plus 0.5.

Further, the second normal information finally obtained by the terminal is exemplarily as follows:

//coordinates conversion
output.position=mul(UNITY_MATRIX_MVP, input.position);
//prepare a detail texture UV, stored in the first two coordinates xy of TEXCOORD0
output.detailUVCoordsAndDepth.xy=TRANSFORM_TEX (input.UVCoordsChannel1,_DetailTex);
//prepare an in-depth information, stored in the third coordinate z of TEXCOORD0
output.detailUVCoordsAndDepth.z=output.position.z.

In a method for rendering of simulating illumination provided by the embodiment of this application, the method of rendering the first virtual object model by using the first illumination information, the first color information, and the first grid vertex information to obtain the second virtual object model in S104 may include: S1041 and S1042 as follows:

S1041: Perform interpolation on the first color information and the second color information corresponding to the first grid vertex information to obtain main vertex color information of each grid vertex corresponding to the first grid vertex information.

S1042: Draw according to a correspondence between the main vertex color information and each grid vertex to obtain the second virtual object model.

In the embodiment of this application, a main vertex color corresponding to each grid vertex in the preset first virtual object model of the terminal is the first color information and the terminal uses an illumination map to render the preset first virtual object model. In this way, the terminal performs interpolation on the first color information and the second color information corresponding to the first grid vertex information to obtain the main vertex color information of each grid vertex corresponding to the first grid vertex information; and then, the terminal draws according to the correspondence between the main vertex color information and each grid vertex to obtain the second virtual object model.

The first color information in the embodiment of this application may be original main vertex color information and the terminal may obtain a detail texture according to the second normal information in the normal map, so as to obtain detail color information.

For example, a process for obtaining the detail color information by the terminal is as follows:

//detail texture
float 3detailMask=tex2D(_DetailTex, input.detailUVCoordsAndDepth.xy).rgb;
//detail color information
float 3detailColor=lerp(_DetailColor.rgb, mainColor, detailMask).

In the embodiment of this application, first, the terminal may first perform interpolation on the detail color and the first color information, which is referred to as new main vertex color information, and then interact the new main vertex color information with the second color information (the first illumination information) extracted from the illumination map to obtain final main vertex color information.

For example, as follows:
//perform interpolation on the detail color and the main vertex color to obtain new main vertex color information
mainColor=lerp(detailColor, mainColor, saturate (input.detailUVCoordsAndDepth.z*DetailTexDepthOffset));
//extract the corresponding first illumination information from the provided MatCap map (a parsing process)
float3matCapColor=tex2D(MatCap,input.diffuseUVAndMatCapCoords.zw). rgb;
//final main vertex color information
float4finalColor=float4(mainColor*matCapColor*2.0, MainColor.a).

In the embodiment of this application, the rendering of the preset first virtual object model by the terminal is rendering performed by combining the original model, the normal map, and the MatCap map, to obtain simulated ambient light and guarantee a correspondence between each grid vertex and the color information output by shadow details (the correspondence between the main vertex color information and each grid vertex). The terminal draws according to the correspondence between each grid vertex and the color information to obtain the second virtual object model.

Figure 7:
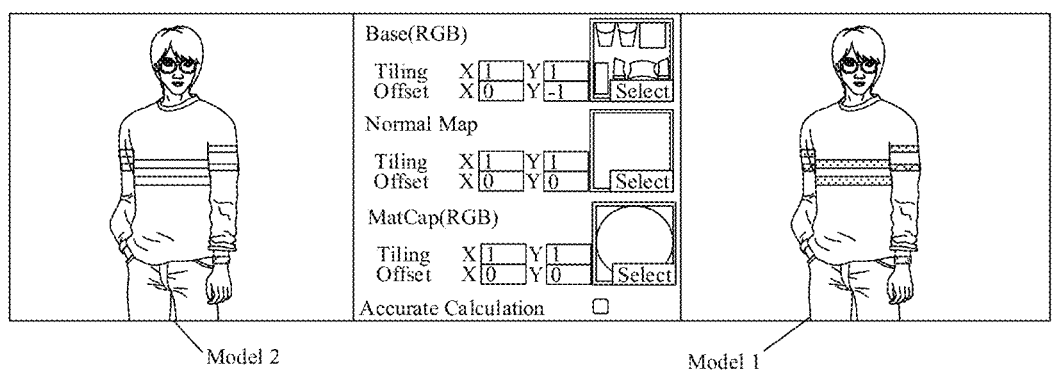
FIG. 7 is a schematic diagram of an exemplary rendering effect according to an embodiment of this application.

For example, compared with a three-dimensional character model, as shown in FIG. 7, an effect of the three-dimensional character model implemented in the method for rendering used in the embodiment of this application is as shown in a model 1 of FIG. 7 and an effect of the three-dimensional character model implemented in the previous method for rendering is as shown in a model 2 of FIG. 7. Upon comparison, it can be learned that the precision of the presenting effect of the model 1 is much higher than that of the model 2 and the presenting effect of the second virtual object model is improved.

Further, in the embodiment of this application, using a three-dimensional character model scene as an example, a result of using the rendered three-dimensional virtual character model in the embodiment of this application is to weaken a trace of a connecting seam by using ambient light coordinated with the normal map at a similar connecting part between a head and a body, mainly aligning shadows at the connecting seam of the normal map. When the Matcap similar to the head and the body part simulates the ambient light, an amount of light keeps consistent at a coordinate point location of the connecting seam, to avoid a relatively obvious trace in cases of different amounts of light at the connecting seam. That is, the point rendering at the connecting seam of parts or tangent planes is weakened aiming at each block of the three-dimensional character model.

Embodiment 3

Figure 8:
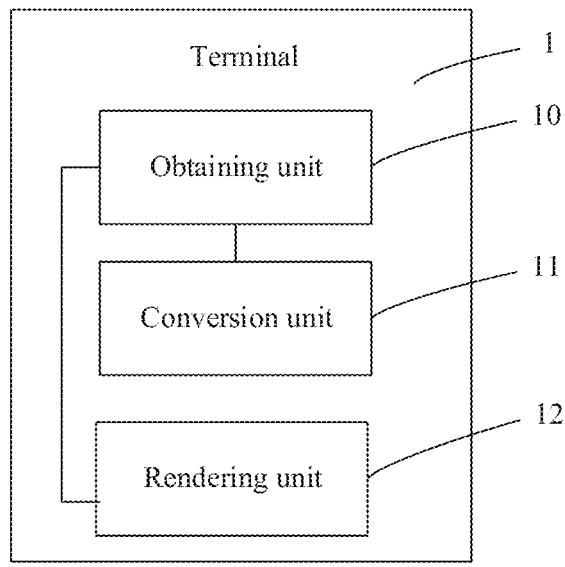
FIG. 8 is schematic structural diagram 1 of a terminal according to an embodiment of this application.

Based on the same inventive concept of Embodiment 1 and Embodiment 2, as shown in FIG. 8, an embodiment of this application provides a terminal 1. The terminal 1 may include:

an obtaining unit 10, configured to obtain first grid vertex information of a preset first virtual object model, first color information corresponding to first grid vertex information, and first normal information, the preset first virtual object model being a preset model to be processed, and the first normal information being obtained by baking a high-precision model corresponding to the preset first virtual object model;

a conversion unit 11, configured to perform vertex space conversion on the first normal information to obtain second normal information corresponding to the first grid vertex information;

the obtaining unit 10 further being configured to obtain first illumination information corresponding to the first grid vertex information according to a preset color setting rule and the second normal information, the preset color setting rule being used to represent a correspondence between colors and illumination; and a rendering unit 12, further configured to render the first virtual object model by using the first illumination information, the first color information, and the first grid vertex information to obtain a second virtual object model.

In a possible implementation, the conversion unit 11 is specifically configured to perform the vertex space conversion on the first normal information to convert the first normal information into a tangent space, to obtain third normal information; and normalize the third normal information to obtain the second normal information.

In a possible implementation, the obtaining unit 10 is specifically configured to store, according to the second normal information and the preset color setting rule, color information on each grid vertex of the first grid vertex information to obtain second color information of the first grid vertex information and use the second color information as the first illumination information.

In a possible implementation, the rendering unit 12 is specifically configured to perform interpolation on the first color information and the second color information corresponding to the first grid vertex information to obtain main vertex color information of each grid vertex corresponding to the first grid vertex information; and draw according to a correspondence between the main vertex color information and each grid vertex to obtain the second virtual object model.

In a possible implementation, the obtaining unit 10 is further configured to: before the obtaining first grid vertex information of a preset first virtual object model, first color information corresponding to the first grid vertex information, and first normal information, obtain second grid vertex information corresponding to a preset third virtual object model, the preset third virtual object model being a high-precision model corresponding to the preset first virtual object model; obtain a first normal direction according to the second grid vertex information and a preset normal model; and determine the first normal information corresponding to the first normal direction according to a preset correspondence between the second grid vertex information and a first grid vertex.

Figure 9:
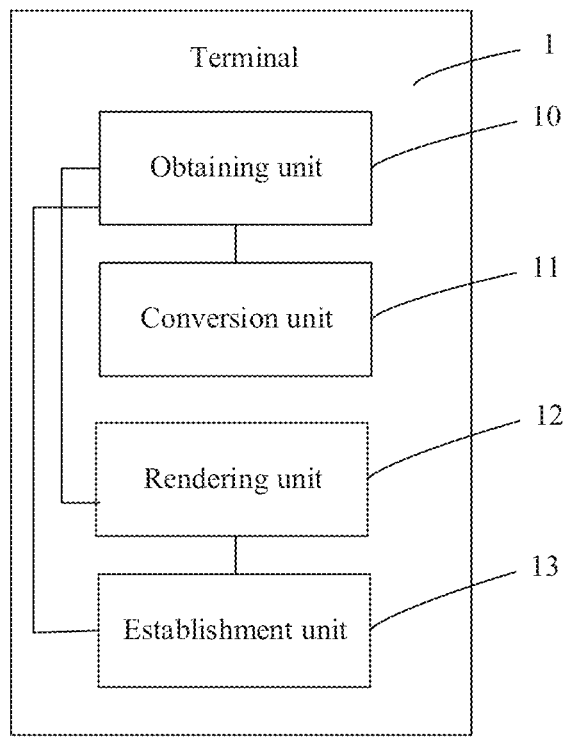
FIG. 9 is schematic structural diagram 2 of a terminal according to an embodiment of this application.

In a possible implementation, based on FIG. 8, as shown in FIG. 9, the terminal 1 further includes: an establishment unit 13.

The obtaining unit 10 is further configured to: before the obtaining first grid vertex information of a preset first virtual object model, first color information corresponding to the first grid vertex information, and first normal information, obtain a scene file.

The establishment unit 13 is configured to establish a first scene according to the scene file.

Figure 10:
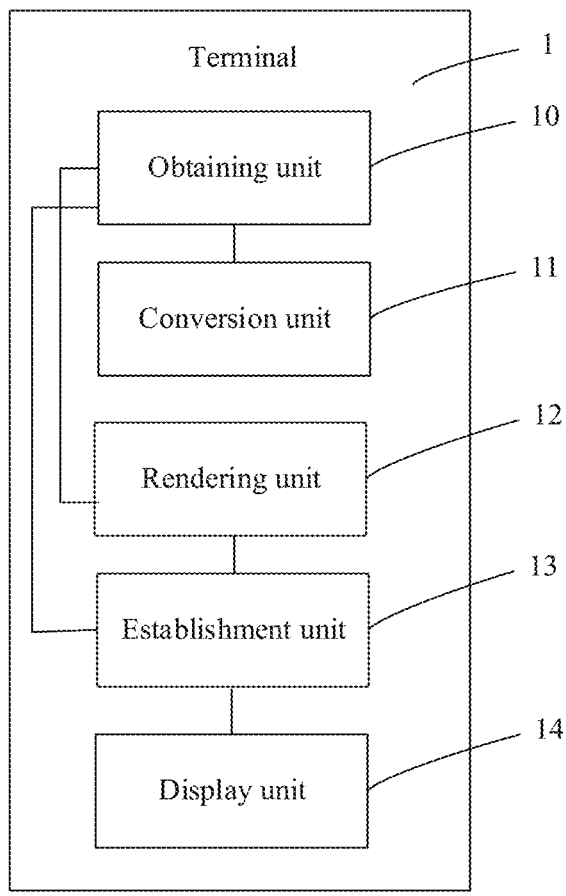
FIG. 10 is schematic structural diagram 3 of a terminal according to an embodiment of this application.

In a possible implementation, based on FIG. 9, as shown in FIG. 10, the terminal 1 further includes: a display unit 14.

The display unit 14 is configured to: after the drawing according to a correspondence between the main vertex color information and each grid vertex to obtain the second virtual object model, display the second virtual object model in the first scene.

It is to be understood that the terminal may parse illumination information corresponding to each grid vertex according to refined normal information determined by the high-precision model and may thus use the illumination information as ambient light to render the first virtual object model. Because the normal information has a very high precision, shadow details of a three-dimensional design model are guaranteed, and the ambient light closed to that of a real environment is simulated, a display effect of the rendered second virtual object model has a very high precision, so that the display effect of the second virtual object model is improved.

Embodiment 4

Figure 11:
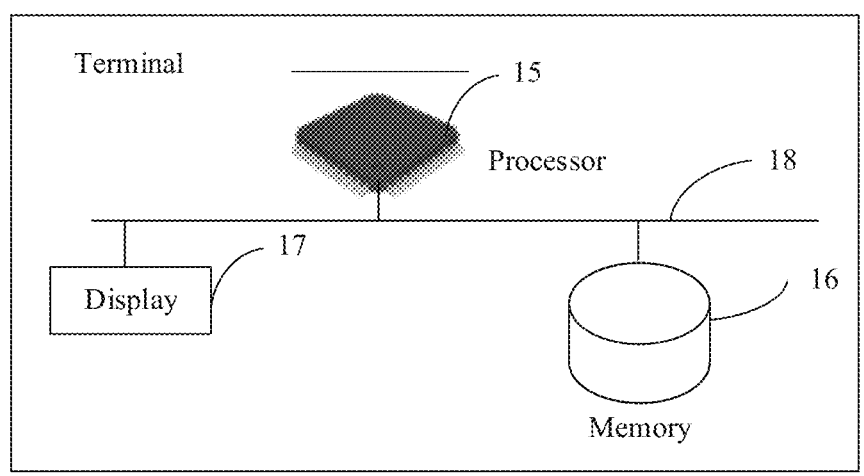
FIG. 11 is schematic structural diagram 4 of a terminal according to an embodiment of this application.

Based on the same inventive concept of Embodiment 1 and Embodiment 2, as shown in FIG. 11, an embodiment of this application provides a terminal. The terminal may include:

a processor 15, a memory 16, a display 17, and a communications bus 18, where the processor 15, the memory 16, and the display 17 are connected through the communications bus 18.

The processor 15 is configured to invoke a related rendering program of simulating illumination stored by the memory 16, and perform the following operations:

obtaining first grid vertex information of a preset first virtual object model, first color information corresponding to first grid vertex information, and first normal information, the preset first virtual object model being a preset model to be processed, and the first normal information being obtained by baking a high-precision model corresponding to the preset first virtual object model; performing vertex space conversion on the first normal information to obtain second normal information corresponding to the first grid vertex information; obtaining first illumination information corresponding to the first grid vertex information according to a preset color setting rule and the second normal information, the preset color setting rule being used to represent a correspondence between colors and illumination; and rendering the first virtual object model by using the first illumination information, the first color information, and the first grid vertex information to obtain a second virtual object model.

The display 17 is configured to display the second virtual object model.

Optionally, the processor 15 is specifically configured to perform vertex space conversion on the first normal information to convert the first normal information into a tangent space, to obtain third normal information; and normalize the third normal information to obtain the second normal information.

Optionally, the processor 15 is specifically configured to store, according to the second normal information and the preset color setting rule, color information on each grid vertex of the first grid vertex information to obtain second color information of the first grid vertex information and use the second color information as the first illumination information.

Optionally, the processor 15 is specifically configured to perform interpolation on the first color information and the second color information corresponding to the first grid vertex information to obtain main vertex color information of each grid vertex corresponding to the first grid vertex information; and draw according to a correspondence between the main vertex color information and each grid vertex to obtain the second virtual object model.

Optionally, the processor 15 is further configured to: before the obtaining first grid vertex information of a preset first virtual object model, first color information corresponding to the first grid vertex information, and first normal information, obtain second grid vertex information corresponding to a preset third virtual object model, the preset third virtual object model being a high-precision model corresponding to the preset first virtual object model; obtain a first normal direction according to the second grid vertex information and a preset normal model; and determine the first normal information corresponding to the first normal direction according to a preset correspondence between the second grid vertex information and a first grid vertex.

Optionally, the processor 15 is further configured to: before the obtaining first grid vertex information of a preset first virtual object model, first color information corresponding to the first grid vertex information, and first normal information, obtain a scene file; and establish a first scene according to the scene file.

Optionally, the display 17 is configured to: after the drawing according to a correspondence between the main vertex color information and each grid vertex to obtain the second virtual object model, display the second virtual object model in the first scene.

It is to be understood that the terminal may parse illumination information corresponding to each grid vertex according to refined normal information determined by the high-precision model and may thus use the illumination information as ambient light to render the first virtual object model. Because the normal information has a very high precision, shadow details of a three-dimensional design model are guaranteed, and the ambient light closed to that of a real environment is simulated, a display effect of the rendered second virtual object model has a very high precision, so that the display effect of the second virtual object model is improved.

In actual application, the memory may be a volatile memory, such as a random-access memory (RAM); or a non-volatile memory, for example a read-only memory (ROM), a flash memory (flash memory), a hard disk drive (HDD) or a solid-state drive (SSD), or a combination of the memories of the foregoing types, and provides an instruction and data for the processor.

The foregoing processor may be at least one of an application-specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It is to be understood that the electronic device implementing the function of the processor may alternatively be other cases. This is not limited in the embodiment of this application.

Embodiment 5

Functional modules in this embodiment may be integrated into one processing unit, or each of the units may exist alone physically, or two or more units are integrated into one unit. The integrated unit may be implemented in the form of hardware, or may be implemented in the form of a software functional module.

When the integrated unit is implemented in the form of a software functional module rather than be sold or used as an independent product, the integrated unit can be stored in a computer readable storage medium. Based on such an understanding, the technical solutions of the embodiment essentially, or the part contributing to the existing technology, or all or a part of the technical solutions may be implemented in a form of a software product. The computer software product is stored in a computer readable storage medium and includes several instructions for instructing one computer device (which may be a personal computer, a server, a network device, or the like) or a processor to perform all or some of steps of the methods described in this embodiment. The foregoing storage medium includes: any medium that can store program code, such as a USB flash drive, a removable hard disk, a read-only memory (ROM), a random access memory (RAM), a magnetic disk, or an optical disc.

A computer readable storage medium provided by the embodiment of this application is applied in the terminal. The computer readable storage medium stores one or more rendering programs of simulating illumination and the one or more rendering programs of simulating illumination may be executed by one or more processors to implement the methods described in Embodiment 1 and Embodiment 2.

It is to be understood by a person skilled in the art that the embodiments of this application may be provided as a method, a system, or a computer program product. Therefore, this application may use a form of a hardware embodiment, a software embodiment, or an embodiment combining software and hardware. Moreover, this application may use a form of a computer program product implemented on one or more computer available storage media (including but not limited to a disk memory, an optical memory, and the like) that include computer available program code.

This application is described with reference to flowcharts and/or block diagrams of the method, the device (system), and the computer program product in the embodiments of this application. It is to be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or the another programmable device provide steps for implementing a specific function in one or more processes in the flowcharts and/or in one or more blocks in the block diagrams.

The above embodiments are merely provided for describing the technical solutions of the embodiments of this application, but not intended to limit the technical solutions of the embodiments of this application. It is to be understood by a person of ordinary skill in the art that although the embodiments of this application have been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

What is claimed is:

1. A method for rendering of simulating illumination performed at a terminal having one or more processors and memory storing a plurality of programs to be executed by the one or more processors, comprising:
    baking, by the terminal, a high-precision model corresponding to a preset first virtual object model to obtain first normal information corresponding to each grid vertex of a plurality of grid vertices associated with the preset first virtual object model, the first normal information recording value details of highlights and shadows of the grid vertex;
    storing, by the terminal, the first normal information corresponding to each grid vertex at a corresponding pixel point on a normal map associated with the preset first virtual object model;
    obtaining, by the terminal, first grid vertex information of the preset first virtual object model, the first grid vertex information including first color information and the first normal information of each grid vertex of the plurality of grid vertices associated with the preset first virtual object model;
    performing, by the terminal, vertex space conversion on the first normal information to obtain second normal information corresponding to the first grid vertex information;
    obtaining, by the terminal, first illumination information corresponding to the first grid vertex information according to a preset color setting rule and the second normal information, the preset color setting rule being used to represent a correspondence between colors and illumination; and
    rendering, by the terminal, the first virtual object model by using the first illumination information, the first color information, and the first grid vertex information to obtain a second virtual object model.

2. The method according to claim 1, wherein the performing, by the terminal, vertex space conversion on the first normal information to obtain second normal information corresponding to the first grid vertex information comprises:
    performing, by the terminal, the vertex space conversion on the first normal information to convert the first normal information into a tangent space, to obtain third normal information; and
    normalizing, by the terminal, the third normal information to obtain the second normal information.

3. The method according to claim 1, wherein the obtaining, by the terminal, first illumination information corresponding to the first grid vertex information according to a preset color setting rule and the second normal information comprises:
    storing, by the terminal, according to the second normal information and the preset color setting rule, color information on each grid vertex of the first grid vertex information to obtain second color information of the first grid vertex information and using the second color information as the first illumination information.

4. The method according to claim 3, wherein the rendering, by the terminal, the first virtual object model by using the first illumination information, the first color information, and the first grid vertex information to obtain a second virtual object model comprises:
    performing, by the terminal, interpolation on the first color information and the second color information corresponding to the first grid vertex information to obtain main vertex color information of each grid vertex corresponding to the first grid vertex information; and
    drawing, by the terminal, according to a correspondence between the main vertex color information and each grid vertex to obtain the second virtual object model.

5. The method according to claim 1, wherein the method further comprises:
    before the obtaining, by the terminal, first grid vertex information of a preset first virtual object model:
        obtaining, by the terminal, second grid vertex information corresponding to the third virtual object model, the third virtual object model being the high-precision model corresponding to the preset first virtual object model;
        obtaining, by the terminal, a first normal direction according to the second grid vertex information and a preset normal model; and
        determining, by the terminal, the first normal information corresponding to the first normal direction according to a correspondence between the second grid vertex information and a first grid vertex.

6. The method according to claim 1, wherein the method further comprises:
    before the obtaining, by the terminal, first grid vertex information of a preset first virtual object model:
        obtaining, by the terminal, a scene file and establishing a first scene according to the scene file.

7. The method according to claim 6, wherein the method further comprises:
    after the drawing, by the terminal, according to a correspondence between the main vertex color information and each grid vertex to obtain the second virtual object model, displaying, by the terminal, the second virtual object model in the first scene.

8. The method according to claim 6, wherein the plurality of operations further comprise:
    after the drawing, by the terminal, according to a correspondence between the main vertex color information and each grid vertex to obtain the second virtual object model, displaying, by the terminal, the second virtual object model in the first scene.

9. A terminal, comprising one or more processors, memory coupled to the one or more processors and a plurality of programs stored in the memory that, when executed by the one or more processors, cause the computing device to perform a plurality of operations comprising:

baking, by the terminal, a high-precision model corresponding to a preset first virtual object model to obtain first normal information corresponding to each grid vertex of a plurality of grid vertices associated with the preset first virtual object model, the first normal information recording value details of highlights and shadows of the grid vertex;

storing, by the terminal, the first normal information corresponding to each grid vertex at a corresponding pixel point on a normal map associated with the preset first virtual object model;

obtaining, by the terminal, first grid vertex information of the preset first virtual object model, the first grid vertex information including first color information and first normal information of each grid vertex of a plurality of grid vertices associated with the preset first virtual object model;

performing, by the terminal, vertex space conversion on the first normal information to obtain second normal information corresponding to the first grid vertex information;

obtaining, by the terminal, first illumination information corresponding to the first grid vertex information according to a preset color setting rule and the second normal information, the preset color setting rule being used to represent a correspondence between colors and illumination; and rendering, by the terminal, the first virtual object model by using the first illumination information, the first color information, and the first grid vertex information to obtain a second virtual object model.

10. The terminal according to claim 9, wherein the performing, by the terminal, vertex space conversion on the first normal information to obtain second normal information corresponding to the first grid vertex information comprises:

performing, by the terminal, the vertex space conversion on the first normal information to convert the first normal information into a tangent space, to obtain third normal information; and normalizing, by the terminal, the third normal information to obtain the second normal information.

11. The terminal according to claim 9, wherein the obtaining, by the terminal, first illumination information corresponding to the first grid vertex information according to a preset color setting rule and the second normal information comprises:

storing, by the terminal, according to the second normal information and the preset color setting rule, color information on each grid vertex of the first grid vertex information to obtain second color information of the first grid vertex information and using the second color information as the first illumination information.

12. The terminal according to claim 11, wherein the rendering, by the terminal, the first virtual object model by using the first illumination information, the first color information, and the first grid vertex information to obtain a second virtual object model comprises:

performing, by the terminal, interpolation on the first color information and the second color information corresponding to the first grid vertex information to obtain main vertex color information of each grid vertex corresponding to the first grid vertex information; and drawing, by the terminal, according to a correspondence between the main vertex color information and each grid vertex to obtain the second virtual object model.

13. The terminal according to claim 9, wherein the plurality of operations further comprise:

before the obtaining, by the terminal, first grid vertex information of a preset first virtual object model:

obtaining, by the terminal, second grid vertex information corresponding to the third virtual object model, the third virtual object model being the high-precision model corresponding to the preset first virtual object model;

obtaining, by the terminal, a first normal direction according to the second grid vertex information and a preset normal model; and determining, by the terminal, the first normal information corresponding to the first normal direction according to a correspondence between the second grid vertex information and a first grid vertex.

14. The terminal according to claim 9, wherein the plurality of operations further comprise:

before the obtaining, by the terminal, first grid vertex information of a preset first virtual object model, obtaining, by the terminal, a scene file and establishing a first scene according to the scene file.

15. A non-transitory computer readable storage medium storing a plurality of machine readable instructions in connection with a terminal having one or more processors, wherein the plurality of machine readable instructions, when executed by the one or more processors, cause the terminal to perform a plurality of operations including:

baking, by the terminal, a high-precision model corresponding to a preset first virtual object model to obtain first normal information corresponding to each grid vertex of a plurality of grid vertices associated with the preset first virtual object model, the first normal information recording value details of highlights and shadows of the grid vertex;

storing, by the terminal, the first normal information corresponding to each grid vertex at a corresponding pixel point on a normal map associated with the preset first virtual object model;

obtaining, by the terminal, first grid vertex information of the preset first virtual object model, the first grid vertex information including first color information and first normal information of each grid vertex of a plurality of grid vertices associated with the preset first virtual object model;

performing, by the terminal, vertex space conversion on the first normal information to obtain second normal information corresponding to the first grid vertex information;

obtaining, by the terminal, first illumination information corresponding to the first grid vertex information according to a preset color setting rule and the second normal information, the preset color setting rule being used to represent a correspondence between colors and illumination; and rendering, by the terminal, the first virtual object model by using the first illumination information, the first color information, and the first grid vertex information to obtain a second virtual object model.

16. The non-transitory computer readable storage medium according to claim 15, wherein the performing, by the terminal, vertex space conversion on the first normal information to obtain second normal information corresponding to the first grid vertex information comprises:

performing, by the terminal, the vertex space conversion on the first normal information to convert the first normal information into a tangent space, to obtain third normal information; and normalizing, by the terminal, the third normal information to obtain the second normal information.

17. The non-transitory computer readable storage medium according to claim 15, wherein the obtaining, by the terminal, first illumination information corresponding to the first grid vertex information according to a preset color setting rule and the second normal information comprises:

storing, by the terminal, according to the second normal information and the preset color setting rule, color information on each grid vertex of the first grid vertex information to obtain second color information of the first grid vertex information and using the second color information as the first illumination information.

18. The non-transitory computer readable storage medium according to claim 17, wherein the rendering, by the terminal, the first virtual object model by using the first illumination information, the first color information, and the first grid vertex information to obtain a second virtual object model comprises:

performing, by the terminal, interpolation on the first color information and the second color information corresponding to the first grid vertex information to obtain main vertex color information of each grid vertex corresponding to the first grid vertex information; and drawing, by the terminal, according to a correspondence between the main vertex color information and each grid vertex to obtain the second virtual object model.

19. The non-transitory computer readable storage medium according to claim 15, wherein the plurality of operations further comprise:

before the obtaining, by the terminal, first grid vertex information of a preset first virtual object model:

obtaining, by the terminal, second grid vertex information corresponding to the third virtual object model, the third virtual object model being the high-precision model corresponding to the preset first virtual object model;

obtaining, by the terminal, a first normal direction according to the second grid vertex information and a preset normal model; and determining, by the terminal, the first normal information corresponding to the first normal direction according to a correspondence between the second grid vertex information and a first grid vertex.

20. The non-transitory computer readable storage medium according to claim 15, wherein the plurality of operations further comprise:

before the obtaining, by the terminal, first grid vertex information of a preset first virtual object model, obtaining, by the terminal, a scene file and establishing a first scene according to the scene file.

\* \* \* \* \*